H. P. SAUNDERSON.
CHANGE SPEED GEARING.
APPLICATION FILED APR. 1, 1918.

1,339,477.

Patented May 11, 1920.

Witnesses.
J. K. Moore
R. E. Barry

Inventor.
H. P. Saunderson

UNITED STATES PATENT OFFICE.

HERBERT PERCY SAUNDERSON, OF BEDFORD, ENGLAND.

CHANGE-SPEED GEARING.

1,339,477.  Specification of Letters Patent.  Patented May 11, 1920.

Application filed April 1, 1918. Serial No. 226,066.

*To all whom it may concern:*

Be it known that I, HERBERT PERCY SAUNDERSON, a subject of the King of Great Britain, residing at Elstow Works, Bedford, England, have invented new and useful Improvements in or Connected with Change-Speed Gearing, of which the following is a specification.

My invention relates to change speed gear for motor tractors and the like, and has for its object to simplify the construction thereof.

According to my invention the gearing with its box and the operating levers forms practically an independent unit which can be readily dismounted from the chassis. The box is made in two main parts, the lower of which is directly secured to the chassis, while the upper part is bolted to the lower and is provided with a removable cover through which access can be readily obtained to the interior of the box without disconnecting the parts.

The levers, by means of which the gears are operated, are mounted on the upper ends of vertical spindles journaled in the upper part of the box, while the arms carrying the forks or pins, which directly actuate the gears, are fixed to the lower ends of the said spindles within the box.

To prevent the possibility of both levers being moved to throw their respective gears into action simultaneously I combine with them a locking bar.

In the accompanying drawing—

$a$, $b$ indicate the lower and upper parts, respectively, of the gear box, the part $a$ having cast upon it the blocks $c$, $d$ which carry the bearings for the first motion shaft $e$ and the second motion shaft $f$, respectively, while the upper part $b$ has cast upon it the corresponding bearing parts or caps $c^1$, $c^1$.

The blocks $d$, $d$ in addition to forming the lower parts of the bearings for the shaft $f$, also constitute feet, by means of which the gear box is supported on the main frame $g$ of the chassis, and the bolts $h$, $h$ which secure the lower box-part to the frame, also serve to secure the two box-parts together; the bolts $i$, $i$ of the bearings for the shaft $e$ also serve as connecting bolts between the two parts.

$k$, $l$ indicate the gears of a two speed pinion which slides upon the first motion shaft $e$, and $k^1$, $l^1$ are speed wheels fixed upon the second motion shaft $f$, the said wheels being designed to gear with the pinions $k$, $l$ respectively. $n$, $n^1$ are pinions connected respectively to the pinion $k$, $l$ on the shaft $e$ and to the shaft $f$, and $n^2$ is a wheel of double width for the reverse, this wheel being carried upon a countershaft $o$ and being in a normally inoperative or neutral position. When the reverse motion is desired the wheel $n^2$ is moved to engage the said wheels $n$ and $n^1$. $n^3$, $n^4$ are collars to prevent the longitudinal movement of the wheel $n^2$ upon the shaft $o$.

The pinion $n^2$ is loosely mounted on the said countershaft $o$ which slides in bearings or bosses $p$, $p$ on the upper part $b$ of the gear box and does not rotate.

It is to be understood that the arrangement of gearing before described forms no part of my invention and is only described in order that the invention may be clearly understood.

$q$, $r$ are the levers by means of which the gears for the forward movement and for the reverse are operated respectively, these levers being mounted upon the upper ends of spindles $q^1$, $r^1$ carried in bosses or bearings $s$, $s$ formed upon, or fixed to, the upper part $b$ of the gear box.

The spindle $q^1$ has fixed to its lower end a lever $q^2$ carrying at its outer end a fork which straddles the wheel $l$, while the spindle $r^1$ carries a lever $r^2$ which engages with a lug on the collar $n^4$ fixed to countershaft $o$, so that the movement of the lever $q$ can place the pinions $k$, $k^1$ or $l$, $l^1$ in engagement, according to the speed required, while the movement of the lever $r$ can move the pinion $n^2$ into simultaneous engagement with the wheels $n$, $n^1$ for the reverse.

Figure 1:
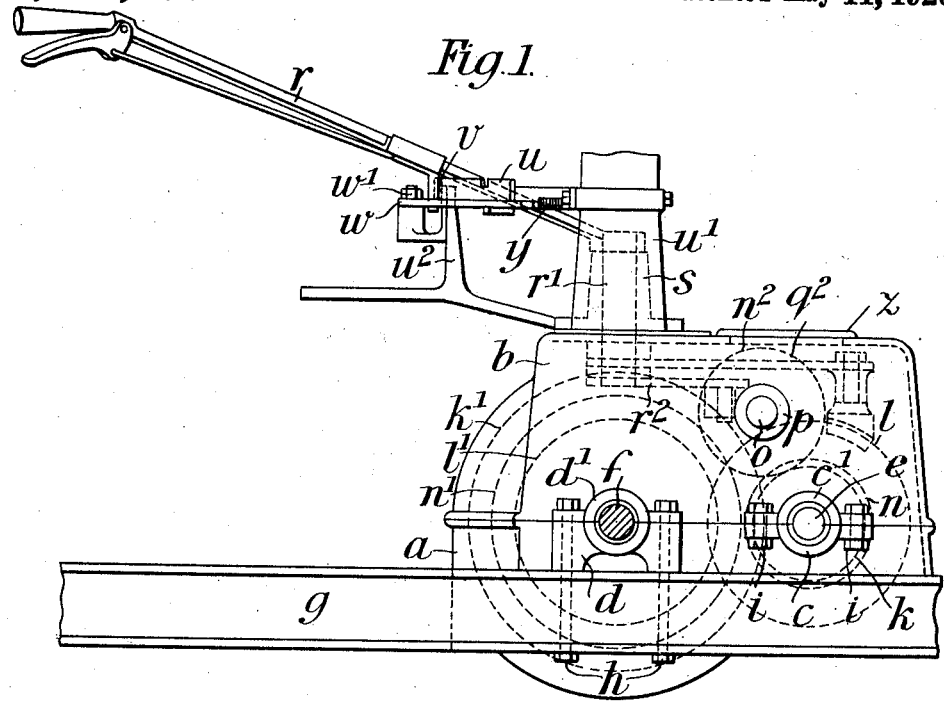
Figure 1 is a side elevation illustrating my improvements.
Figure 2:
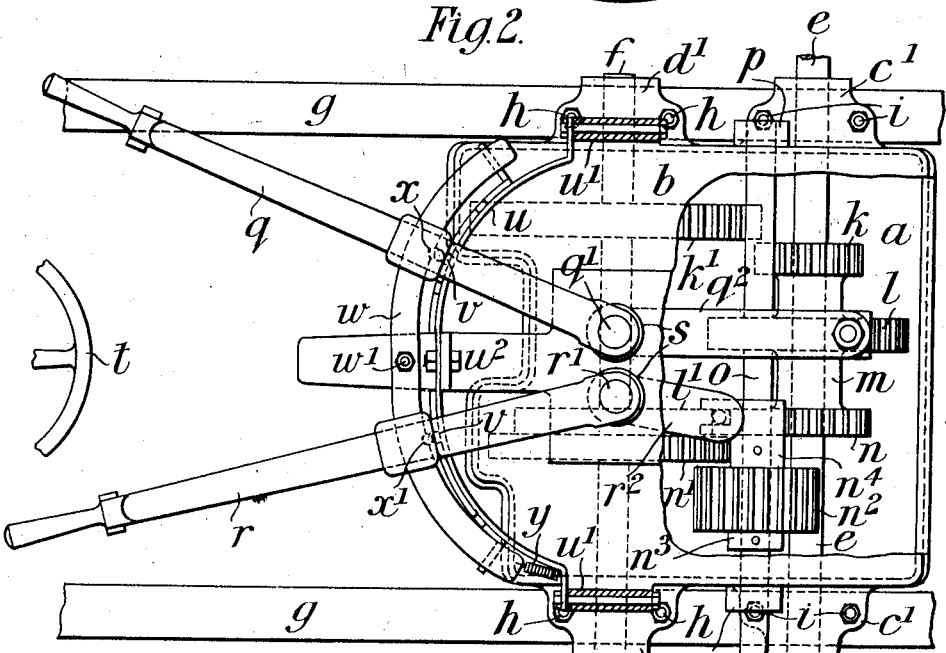
Fig. 2 is a sectional plan.

The levers $q$, $r$ are fixed to their vertical spindles so that they preferably lie in the same plane, and so that they are located on opposite sides of the steering wheel, indicated by the letter $t$ in Fig. 2, thereby enabling the driver to operate one lever with his right hand and the other with his left hand.

$u$ indicates a quadrant mounted upon brackets $u^1$, $u^1$ and $u^2$ on the box part $b$, the said quadrant having in it a series of notches corresponding with the several positions of the levers $q$, $r$ on which are lever catches $v$, $v$ of ordinary construction designed to engage with the said notches.

$w$ is the locking-bar for preventing the catches $v$, $v$ of both levers being simultaneously disengaged, the said locking-bar being pivoted at $w^1$ to the bracket $u^2$. This locking bar has in it notches $x$, $x^1$, corresponding with the lever catches $v$, $v$ on the levers $q$, $r$ respectively when the latter are in their normal or neutral positions, and is pivoted upon the bracket $u^2$ in such relation to the quadrant $u$ as to allow either lever catch $v$ to be withdrawn so that the lateral movement of the corresponding lever will cause the oscillation of the locking-bar to engage with the catch $v$ of the other lever to lock it by preventing the withdrawal of its said catch.

For instance, if the lever catch $v$ of the lever $r$ is to be withdrawn, to put in the reverse, it is necessary that the catch $v$ of the lever $q$ should be in coincidence with the notch $x$ to allow of the locking-bar $w$ oscillating to a sufficient extent to afford space for the catch $v$ of the lever $r$ to move between the locking-bar and the quadrant, thereby preventing the movement of the lever $q$ until the lever $r$ has been returned to such a position that its lever catch is in coincidence with the notch $x^1$. When the lever $r$ is in this position the lever $q$ can be moved, but not otherwise.

$y$ indicates a spring which normally retains the locking-bar in engagement with the catch of the reversing lever.

$z$ indicates the removable cover upon the box part $b$ for affording access to the interior of the gear box.

Having now particularly described and ascertained the nature of my said invention and in what manner the same is to be performed, I declare that what I claim is:—

1. In a progressive change speed and reverse gear set, the combination with a box made of two main parts, bearings formed partly in the lower and partly in the upper main part, a first shaft and a second shaft mounted in said bearings, a unitary group of slidable gears mounted on the first shaft, gears mounted on the second shaft adapted to be engaged by some of the gears of said group, a shiftable reverse gear mounted in the upper part of the box and adapted to be engaged with one of the gears of said group and with the last named gear on the second shaft, independent shifting levers pivoted about normally vertical axis and shiftable normally horizontally for engaging said gears in different relations, and locking mechanism for preventing movement of one of said levers while another lever is out of neutral position.

2. A progressive change speed and reverse gear set, comprising a first shaft, a unitary group of slidable gears thereon, a second shaft, gears thereon adapted to be engaged by some of the gears of said group, another gear on said second shaft, a shiftable reverse gear adapted to be engaged with one of the gears of said group and with the last named gear on the second shaft, and independent shifting levers pivoted about normally vertical axis and shiftable normally horizontally for engaging said gears in different relations.

3. A mechanism of the kind defined in claim 2 in which one of the shifting levers actuates the group of slidable gears and another shifting lever actuates the reverse gear, and relatively diverging hand levers operatively connected with said shifting levers.

4. A mechanism of the kind defined in claim 2 having hand levers operatively connected with the shifting levers, and locking mechanism for preventing movement of one of said levers while another lever is out of neutral position.

HERBERT PERCY SAUNDERSON.